(12) United States Patent
Nielsen et al.

(10) Patent No.: US 9,589,179 B2
(45) Date of Patent: Mar. 7, 2017

(54) OBJECT DETECTION TECHNIQUES

(71) Applicant: Microsoft Corporation, Redmond, WA (US)

(72) Inventors: Andrew Sherman Nielsen, Redmond, WA (US); Yongjun Wu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 392 days.

(21) Appl. No.: 14/133,814

(22) Filed: Dec. 19, 2013

(65) Prior Publication Data
US 2015/0178552 A1 Jun. 25, 2015

(51) Int. Cl.
*G06K 9/00* (2006.01)
*G06T 7/20* (2006.01)
(Continued)

(52) U.S. Cl.
CPC ..... *G06K 9/00261* (2013.01); *G06K 9/00805* (2013.01); *G06K 9/3233* (2013.01); *G06K 9/6857* (2013.01); *G06T 7/20* (2013.01); *G08B 13/1961* (2013.01); *G08B 13/19602* (2013.01); *G06K 9/00335* (2013.01);
(Continued)

(58) Field of Classification Search
CPC ............. G06K 9/00261; G06K 9/6857; G06K 2009/6213; G06K 9/00221; G06K 9/00228; G06K 9/00335; G06K 9/00342; G06K 9/00362; G06K 9/00577; G06K 9/00805; G06K 9/3233; G06K 9/3241; G06K 2209/21; G06T 2207/10016; G06T 2207/30201; G06T 7/20; G06T 7/2006; G06T 7/204; G06T 7/2053;
(Continued)

(56) References Cited

U.S. PATENT DOCUMENTS 5,103,305 A * 4/1992 Watanabe ............. G06T 7/2033
348/700
5,164,992 A * 11/1992 Turk .................... A61B 5/1176
375/E7.026
(Continued)

FOREIGN PATENT DOCUMENTS

GB 2446293 A * 8/2008 ........... G06K 9/3241
KR 100956747 5/2010

OTHER PUBLICATIONS

"Work Queue and Threading Improvements", Available at <http://msdn.microsoft.com/en-us/library/windows/desktop/hh848339(v=vs.85).aspx>, Oct. 12, 2013, 4 Pages.
(Continued)

*Primary Examiner* — Manav Seth
(74) *Attorney, Agent, or Firm* — Qudus Olaniran; Judy Yee; Micky Minhas

(57) ABSTRACT

Object detection techniques are described. In one or more implementations, a plurality of images are received by a computing device. The plurality of images are analyzed by the computing device to detect whether the images include, respectively, a depiction of an object. If an object is found in a first image, the locations, angles and scales for object detection can be further restricted in a second one. If an object is not found in a first one of the image, different portions of a second one of the images are analyzed for object detection.

27 Claims, 9 Drawing Sheets

(51) Int. Cl.
*G08B 13/196* (2006.01)
*G06K 9/32* (2006.01)
*G06K 9/68* (2006.01)
*G06K 9/62* (2006.01)

(52) U.S. Cl.
CPC . *G06K 9/00362* (2013.01); *G06K 2009/6213* (2013.01); *G06T 2207/10016* (2013.01); *G06T 2207/30201* (2013.01)

(58) Field of Classification Search
CPC ........ G08B 13/19602; G08B 13/19606; G08B 13/19608; G08B 13/1961; H04N 5/144
See application file for complete search history.

(56) References Cited

U.S. PATENT DOCUMENTS

| | | | |
|---|---|---|---|
| 6,205,231 B1* | 3/2001 | Isadore-Barreca | G06K 9/32 375/E7.081 |
| 6,963,658 B2* | 11/2005 | Hagihara | G06T 7/2053 348/154 |
| 7,227,893 B1* | 6/2007 | Srinivasa | G06K 9/00771 348/155 |
| 7,248,750 B2* | 7/2007 | Matsumoto | G06T 7/004 345/589 |
| 7,454,342 B2 | 11/2008 | Nefian et al. | |
| 7,508,535 B2 | 3/2009 | Hart et al. | |
| 7,801,330 B2* | 9/2010 | Zhang | G06K 9/00771 348/143 |
| 7,840,031 B2* | 11/2010 | Albertson | A63B 24/0003 382/103 |
| 8,249,329 B2* | 8/2012 | Silver | G06K 9/4609 382/141 |
| 8,390,669 B2 | 3/2013 | Catchpole et al. | |
| 8,447,069 B2* | 5/2013 | Huang | G06T 7/2006 382/103 |
| 8,448,858 B1* | 5/2013 | Kundu | G07F 17/3241 235/375 |
| 8,483,283 B2 | 7/2013 | Tian et al. | |
| 8,675,099 B2* | 3/2014 | Pope | G06K 9/00261 348/222.1 |
| 9,189,687 B2* | 11/2015 | Thornton | H04N 7/18 |
| 9,349,076 B1* | 5/2016 | Liu | G06K 9/6256 |
| 2011/0182474 A1* | 7/2011 | Pope | G06K 9/00261 382/103 |
| 2012/0179742 A1 | 7/2012 | Acharya et al. | |

OTHER PUBLICATIONS

Costache, et al., "Real-Time Video Face Recognition for Embedded Devices", In Book, New Approaches to Characterization and Recognition of Faces Chapter 6, Aug. 1, 2011, pp. 115-131.

Kim, et al., "A 201.4 GOPS496 mW Real-Time Multi-Object Recognition Processor with Bio-Inspired Neural Perception Engine", In IEEE Journal of Solid-State Circuits, vol. 45, Issue 1, Jan. 2010, pp. 32-45.

Oh, et al., "Low-Power, Real-Time Object-Recognition Processors for Mobile Vision Systems", In IEEE Micro, vol. 32, Issue 6, Nov. 15, 2012, pp. 38-50.

* cited by examiner

OBJECT DETECTION TECHNIQUES

BACKGROUND

Object detection may be utilized to support a wide variety of functionality. One example of this functionality is face detection. Face detection may be utilized in a variety of ways, such as to determine whether an image includes a face, an identity of a face that is included in the image (e.g., facial recognition), a location of the face in the image, the scale and size of a face, the orientation of a face, and so on.

Conventional techniques that were utilized to perform face detection, however, were often resource intensive. Therefore, these techniques were off ill-suited for use by mobile communications devices that may have limited processing or memory resources such as mobile phones, tablets and so forth. For example, these techniques, when utilized by a mobile communications device, could consume a majority of the available computational resources of the device, may not support performance in real time, drain battery quickly and so on and therefore limit the usefulness of the techniques with the device.

Consequently, use of these techniques was often limited to devices having a significant amount of resources. Even then, the proliferation of techniques that are utilized to conserve power and even computational resources of resource-rich devices could also limit the usefulness of conventional face detection techniques from being performed adequately by these devices.

SUMMARY

Object detection techniques are described. In one or more implementations, a computing device receives a plurality of images that were captured using one or more cameras, or from other sources, such as reading from a file. The plurality of images are analyzed by the computing device to detect whether the images include, respectively, a depiction of an object. The analyzing is performed such that one or more portions used to detect the object in a first one of the images is different than one or more portions used to detect the object in a second one of the images.

In one or more implementations a computing device includes a processing system and memory. The processing system includes a plurality of processor cores, each of the plurality of processor cores is configured to execute one or more threads such that the processing system is configured to execute a plurality of the threads in parallel. The memory is configured to store one or more instructions that are executable to cause the processor system to perform operations. The operations include analyzing one or more images to detect an object in which performance of the analysis is separated for execution on the plurality of processor cores such that the processor cores utilize different scales or angles, one to another, to perform the analysis to detect the object.

In one or more implementations, a determination is made by a computing device as to whether a human face has previously been detected in one or more frames of images captured by one or more cameras. Responsive to a determination that the human face has been detected, one or more characteristics of the previous detection of the human face are utilized to detect the human face in one or more subsequent frames of images. Responsive to a determination that the human face has not been detected, a plurality of processor cores of the computing device are employed to analyze the one or more subsequent frames to perform the detection in which performance of the analysis is separated for execution on the plurality of processor cores such that the processor cores utilize different scales or angles, one to another, to perform the analysis to detect the human face.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Computing devices may be configured to reduce power consumption, e.g., when a workload is relatively low. For example, mobile communications devices and even conventional desktop computers or laptops may be configured to conserve computational resources. However, conventional face detection techniques may consume significant amounts of computational resources of a computing device and thus may run counter to these configurations.

Object detection techniques are described. In one or more implementations, object detection techniques such as face detection may be configured to be performed with increased efficiency over conventional techniques. This may include configuration of how an object is detected, such as a scale/size for the object, where in an image object detection is performed, angles at which an object is oriented in an image, location of the object, and so on. Additionally, these techniques may leverage multi-core processor systems such that different techniques (e.g., scale/size, angle, region) are performed at different cores, searching through different locations, different aspects of the techniques (e.g., different scales/sizes), and so on may be performed on the different cores. Further, object detection may be performed by leveraging knowledge of object detection performed for previous frames of a video stream. This may include leveraging previous detection of where an object was located in an image, an angle at which the object was detected, a scale of the detected object, and so on. Thus, a variety of different techniques may be utilized to increase efficiency and decrease computational resource consumption in detecting an object in an image, such as a face. Further discussion of these and other examples may be found in relation to the following sections In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
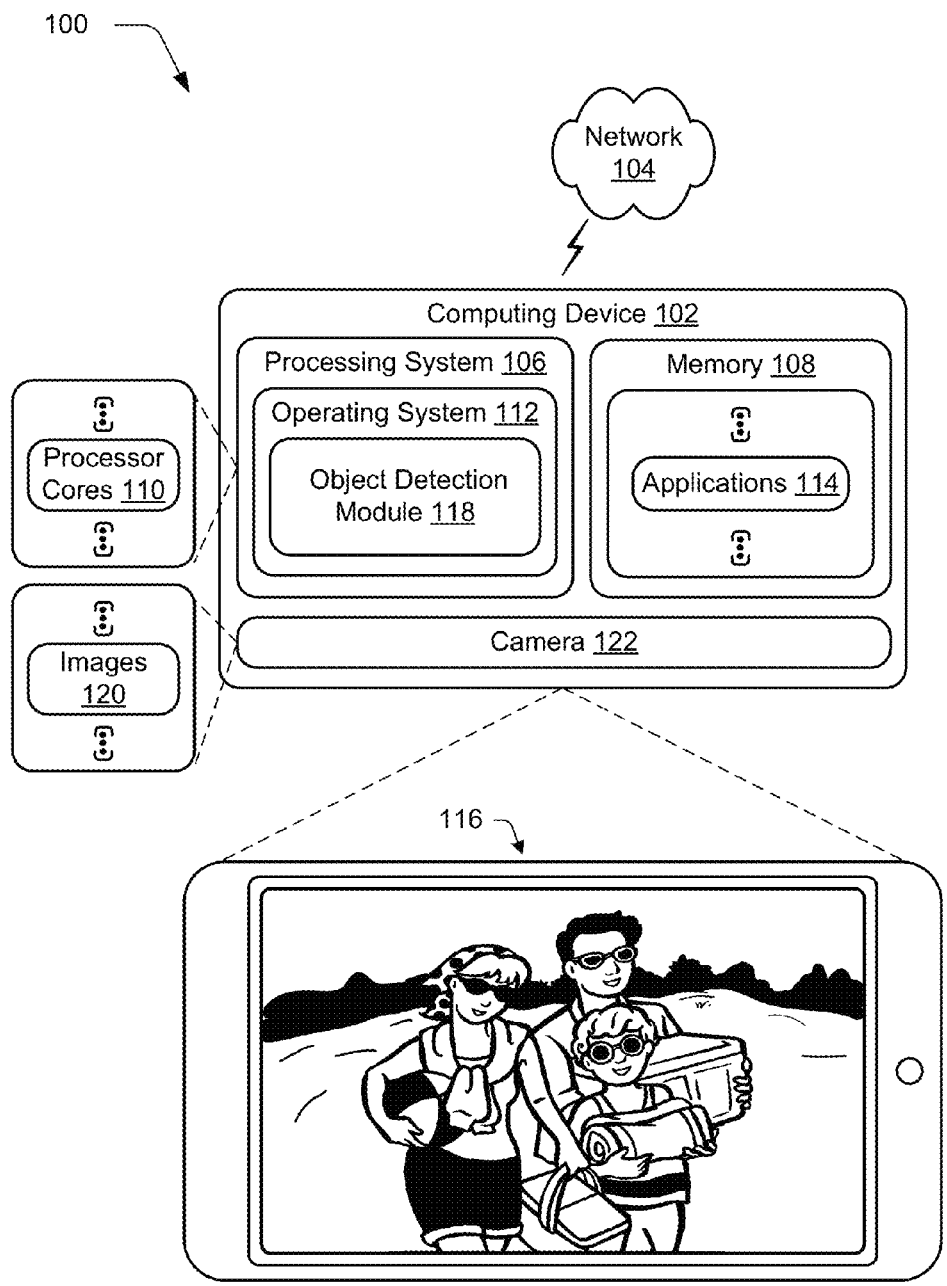
FIG. 1 is an illustration of an environment in an example implementation that is operable to perform object detection techniques.

FIG. 1 is an illustration of an environment 100 in an example implementation that is operable to employ techniques described herein. The illustrated environment 100 includes a computing device 102 that may be configured in a variety of ways. For example, the computing device 102 may be configured as a computer that is capable of communicating over a network 104, The computing device 102 may also be configured as a low-resource device with limited memory and/or processing resources, such as traditional set-top boxes, a mobile communications device as illustrated such as a mobile phone, tablet, portable game device, portable gaming device, and so on. Additionally, although a single computing device 102 is shown, the computing device 102 may be representative of a plurality of different devices, such as multiple servers utilized by a business to perform operations such as by the web service 104, a remote control and set-top box combination, an image capture device and a game console configured to capture gestures, and so on.

Although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks.

The computing device 102 is also illustrated as including a processing system 106 and an example of computer-readable storage media, which in this instance is memory 108. Although a single memory 108 is shown, a wide variety of types and combinations of memory may be employed, such as random access memory (RAM), hard disk memory, removable medium memory, and other types of computer-readable media.

The processing system 106 is not limited by the materials from which it is are formed or the processing mechanisms employed therein. For example, the processing system 106 may be comprised of semiconductor(s) and/or transistors (e.g., electronic integrated circuits (ICs)), such as a system on a chip, CPUs, functional blocks, and so on. In such a context, executable instructions may be electronically-executable instructions. Alternatively, the mechanisms of or for processing system 106, and thus of or for a computing device, may include, but are not limited to, quantum computing, optical computing, mechanical computing (e.g., using nanotechnology), and so forth.

In the illustrated example, the processing system 106 includes a plurality of processor cores 110, which may be integrated into one or more integrated circuit packages. Each of the processor cores 110 is representative of a central processing unit that may execute a thread. Thus, the plurality of processor cores 110 may be leveraged to execute a plurality of threads in parallel. The processor cores 110 may be leveraged to support a variety of functionality, examples of which are further described below.

The computing device 102 is further illustrated as including an operating system 112. The operating system 112 is configured to abstract underlying functionality of the computing device 102 to applications 114 that are executable on the computing device 102. For example, the operating system 112 may abstract the processing system 106, memory 108, network, input/output, and/or display functionality of the computing device 102 such that the applications 114 may be written without knowing "how" this underlying functionality is implemented. The application 114, for instance, may provide data to the operating system 112 to be rendered and displayed by the display device 104 without understanding how this rendering will be performed. An example of this is illustrated as a user interface that is displayed on the display device 116 of the computing device 102. The operating system 108 may also represent a variety of other functionality, such as to manage a file system and user interface that is navigable by a user of the computing device 102.

The operating system 112 is also illustrated as including an object detection module 118. The object detection module 118 is representative of functionality to detect objects such as faces in images 120. The images 120, for instance, may be captured by a camera 122 of the computing device 102 or other device, such as a dedicated camera, other computing device, and so on. The camera 122 may be configured in a variety of ways, such as a front facing or rear facing camera disposed in a housing of the computing device 102 when configured in a mobile configuration, a gesture capture device of a game console, and so forth. Thus, the object detection module 118 may be implemented as part of the operating system 112 of the computing device 102, as a stand-alone module, as part of the applications 114, implemented all or as part of a web service available via the network 104, and so on.

Regardless of where the images 120 originated or how the object detection module 118 is implemented, the object detection module 118 may utilize a wide variety of techniques to perform object detection. For example, the object detection module 118 may be configured to process a plurality of images 120 that are included in a video stream. Object detection may be utilized to support a variety of functionality, such as to detect whether an object (e.g., a face) is included in an image, to identify a face in an image (e.g., facial recognition), identify location and/or movement of an object (e.g., a game controller), and so forth. As previously described, however, mobile communications devices and even full resource devices may be configured to conserve computational resources and thus power consumption of the device and as such conventional detection techniques may run counter to this desire.

Accordingly, the object detection module 118 may be configured to employ a variety of techniques to improve efficiency and computational resource usage in performing object detection, such as facial recognition. For example, the object detection module 118 may be configured to detect objects using different scales, an example of which is described in relation to FIG. 2. In another example, the object detection module 118 may be configured to detect objects in particular regions of an image, an example of which is described in relation to FIG. 3. In a further example, the object detection module 118 may be configured to detect objects located at different angles in the image, an example of which is described in relation to FIG. 4.

Figure 5:
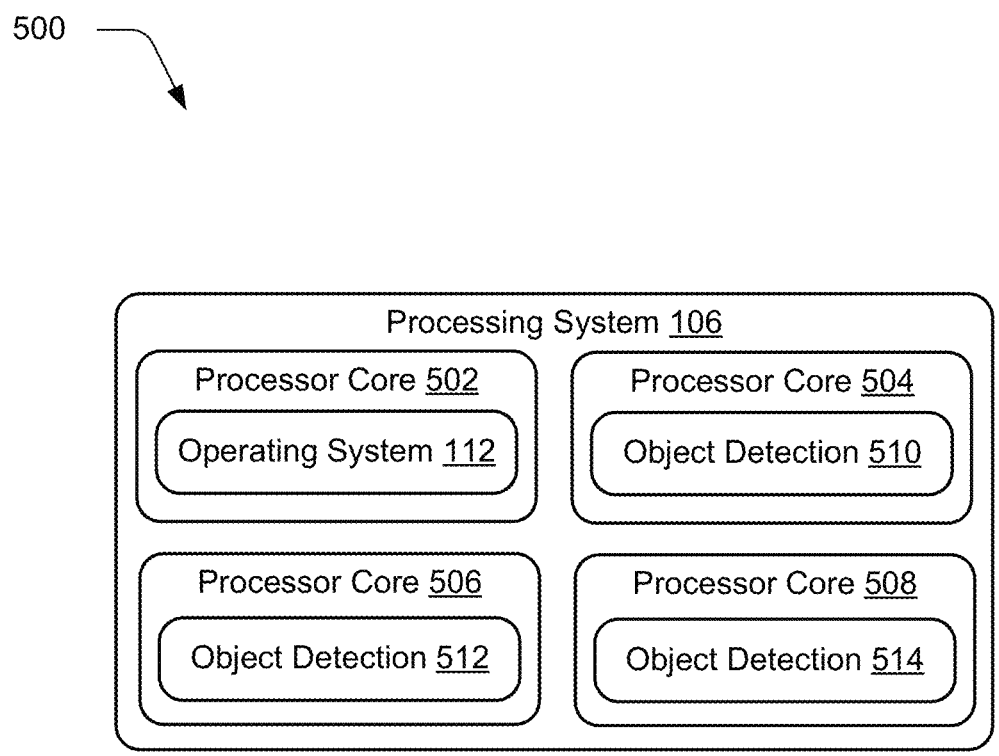
FIG. 5 depicts an example of a system including a plurality of processor cores of a processing system that is leveraged to perform the object detection techniques described herein.

The object detection module 118 may also be configured to leverage a plurality of processor cores 110 of the processor system 106 to perform this or other analysis, an example of which is described in relation to FIG. 5. Yet further, the object detection module 118 may also be configured to leverage knowledge of previous detection of an object such as to optimize a detection process based on whether an object on object was detected in a previous frame, examples of which are described in relation to FIG. 6.

Other examples of functionality that may be employed by the object detection module 118 are also contemplated and discussed in the following. Although the following discussion describes examples of object detection that involve face detection, other objects are also contemplated, such as to detect a game controller for a game system, prop involved in a presentation, and so on as previously described.

Figure 2:
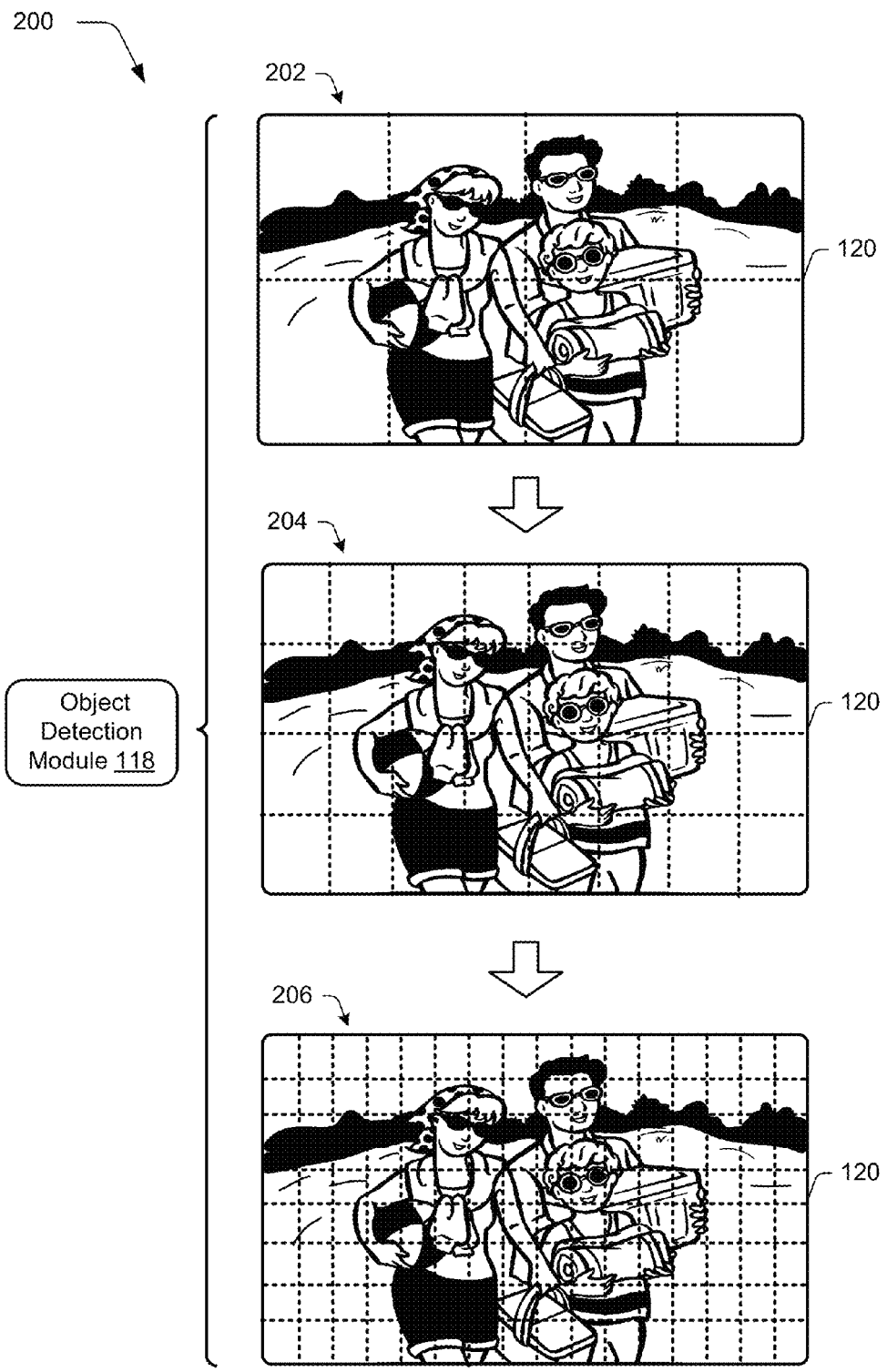
FIG. 2 depicts a system in an example implementation showing object detection that is performed using techniques based at least in part on a likely scale of the object.

FIG. 2 depicts a system 200 in an example implementation showing object detection that is performed using techniques based at least in part on a likely scale of the object. The system 200 is shown as including first, second, and third operations 202, 204, 206. Although the operations are shown sequentially in the figure, it should be readily apparent that the order at which the operations are performed may change without departing from the spirit and scope thereof. Further, the operations may be performed in parallel through use of a plurality of processor cores 110, an example of which is further described in relation to FIG. 5.

At the first operation 202, the object detection module 118 analyzes the image 120 based on a likely scale of an object, which is a face in this example. The scale is shown through the use of phantom lines that show examples of portions of the image 120 that are processed by the object detection module 118 to locate the object, e.g., a face. Although non-overlapping portions are shown, the object detection module 118 may also utilize portions that overlap, e.g., through a step function in which a portion (e.g., window) that is analyzed is moved based on a step that is sized less than a size along one or more axes of the portion, e.g., a ten by ten pixel square portion that is moved by steps of five pixels.

If an object (e.g., a face) is not detected in this example, a smaller scale (e.g., size) is utilized as part of the second operation 204 by the object detection module 118 to locate the object in the image 120. As before, although non-overlapping portions are shown, the object detection module 118 may also utilize portions that overlap, e.g., through a step function.

The process in this example may continue for increasingly smaller scales until an object is detected by the object detection module 118 as shown in the third operation 206. In this way, the object detection module 118 may be configured to locate objects that correspond, generally, to a predetermined scale and thus may conserve processing resources that would otherwise be consumed without such a limitation.

The system 200 in this example is configured to locate an object (e.g., a face) in an image 120 that has the largest scale and once done, the process ceases. This may support a variety of functionality, such as to locate and identify a likely user/owner of the computing device 102, e.g., to perform facial recognition to recognize a user to act as a password, for use in a gaming system to determine a likely user that is interacting with the system (e.g., watching TV, playing a game), and so forth. Other examples are also contemplated, such as to reverse the order, perform in parallel, and so on.

Figure 3:
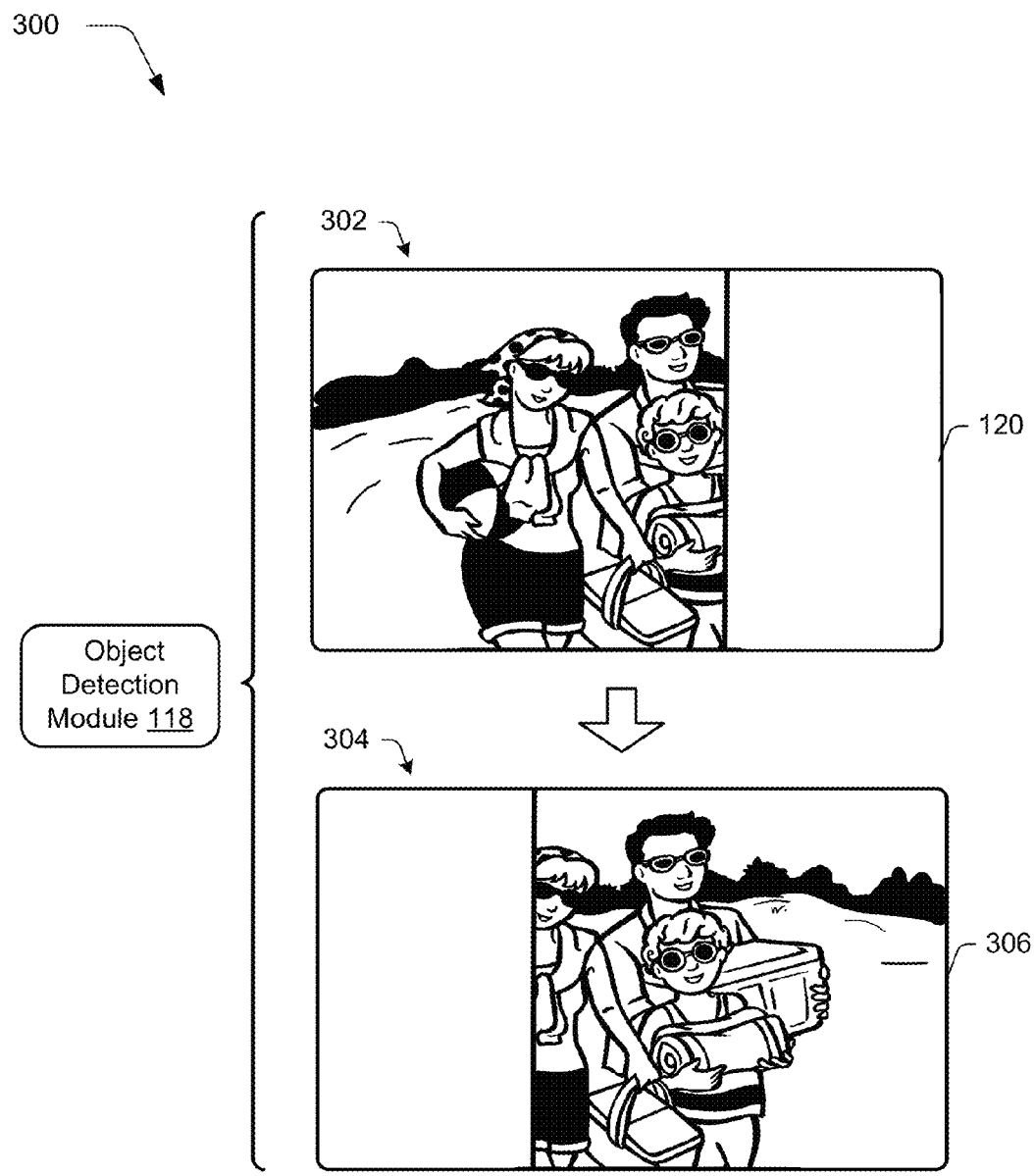
FIG. 3 depicts a system in an example implementation showing object detection that is performed using techniques to process different regions of an image.

FIG. 3 depicts a system 300 in an example implementation showing object detection that is performed using techniques to process different regions of an image. As previously described, the images 120 received by the object detection module 118 may be part of a video stream. Consequently, it may be computationally expensive to fully process each of the images 120, especially in real time using conventional object detection techniques. Accordingly, in this example different regions of an image or different images are analyzed to perform object detection.

The system 300 is shown as including first and second operations 302, 304. Although the operations are shown sequentially in the figure, it should be readily apparent that the order at which the operations are performed may change without departing from the spirit and scope thereof. Further, the operations may be performed in parallel through use of a plurality of processor cores 110, an example of which is further described in relation to FIG. 6.

At the first operation 302, the object detection module 118 is illustrated as analyzing a region that includes approximately two-thirds of the left side of the image 120 to detect an object, e.g., a face. Consequently, the first operation 302 forgoes analysis of the other one-third of the image 120 in this example.

The second operation 304 is then used to analyze a region that includes approximately two-thirds of the right side of a subsequent image 306 to detect an object. As before, the second operation 304 thereby forgoes analysis of the other one third of the image 120 in this example. For example, the subsequent image 306 may follow image 120 in a video stream captured by the camera 122 of the computing device 102. It should be readily apparent that although left and right regions were described, a variety of other examples are also contemplated, such as a sequence that starts with a center portion and then is followed by left or right portions, top or bottom portions, and so on. Further although this analysis was described for different images, this technique may also be perform using a single image without departing from the spirit and scope thereof.

The scale and location of the region may be also be configured based on a variety of different considerations. For example, the scale of the region may be based on computational (e.g., processing, memory) resources of the computing device 102. A location of the region in the image 120 may be based on a likelihood of "where" in the image 120 the object is located, e.g., based on historical data as further described in relation to FIG. 6, and so on. An order at which different locations are cycled may also be configured based on a variety of considerations, such as "where" an object was last seen which is also described in relation to FIG. 6.

A variety of other examples are also contemplated without departing from the spirit and scope thereof.

Figure 4:
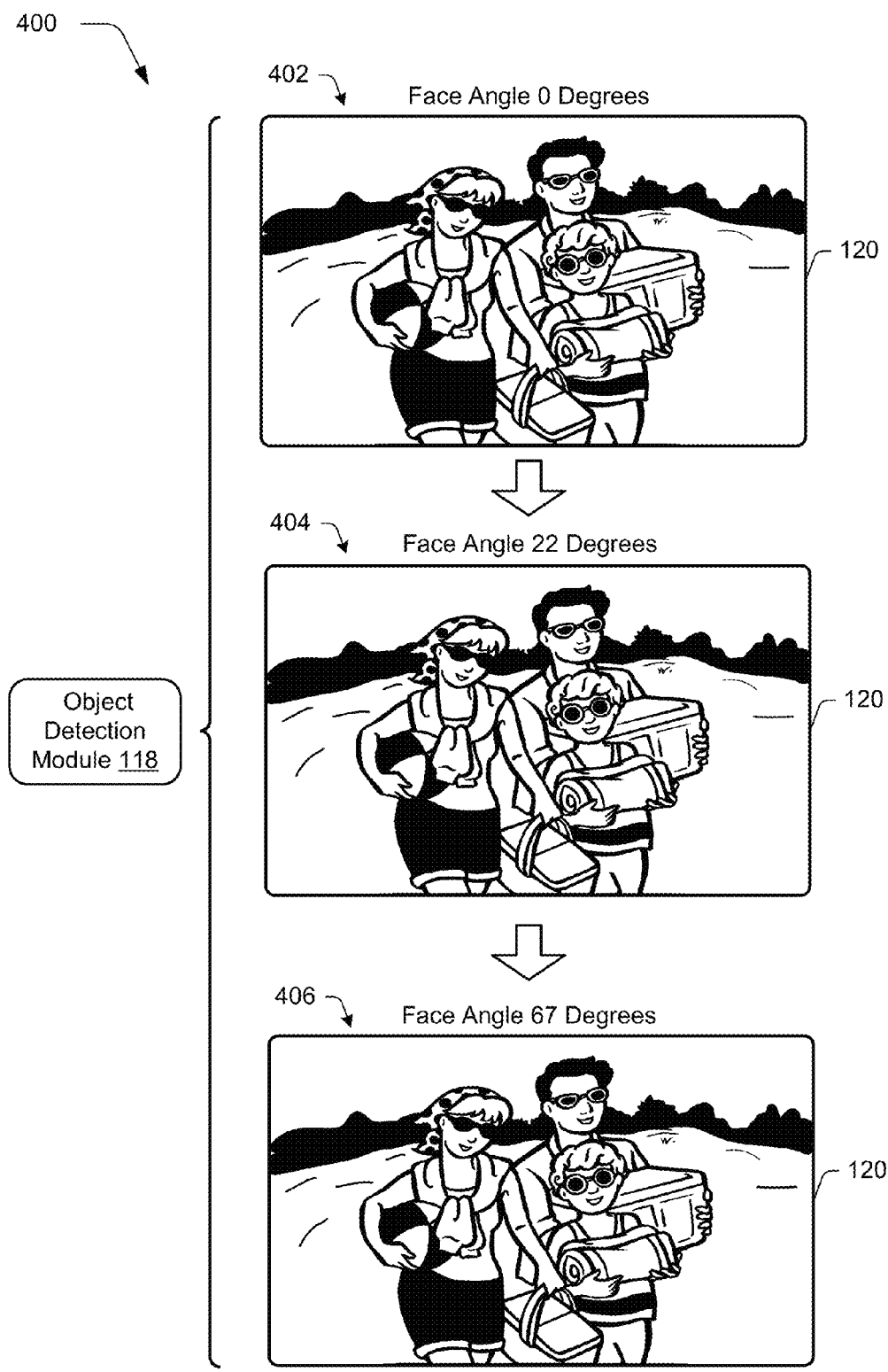
FIG. 4 depicts a system in an example implementation showing object detection that is performed using techniques to detect an object that is located at different orientations (e.g., angles) in an image.

FIG. 4 depicts a system 400 in an example implementation showing object detection that is performed using techniques to detect an object that is located at different orientations in an image. The system 400 is shown as including first, second, and third operations 402, 404, 406. Although the operations are shown sequentially in the figure, it should be readily apparent that the order at which the operations are performed may change without departing from the spirit and scope thereof. Further, the operations may be performed in parallel through use of a plurality of processor cores 110, an example of which is further described in relation to FIG. 5.

At the first operation 402, the object detection module 118 analyzes the image 120 at a first orientation, which in this instance is a face angle of zero degrees. As shown in the image 120, for instance, three members of a family are depicted, each with a facial orientation that is different with respect to the image. The object detection module 118 may therefore be configured to look at different likely orientations in a sequence that is configured to locate a desired object, such as a likely user of the computing device 102 as previously described. Therefore, a face angle of a user oriented at approximately zero degrees may have an increased likelihood of being a user of the computing device 102. Accordingly, the object detection module 118 may first begin by analyzing the image 120 for faces disposed at that orientation in the image 120.

Successively larger angles may then be used for subsequent operations, such as a face angle at approximately 22 degrees as shown in the second operation 404 followed by a face angle at approximately 67 degrees for the third operation 406. Thus, the process in this example may continue for increasingly larger angles until an object is detected by the object detection module 118. In this way, the object detection module 118 may be configured to conserve processing resources that would otherwise be consumed without such a limitation to achieve the desired result, e.g., a user of the computing device 102 in this example. Other examples are also contemplated, such as to reverse the order, perform in parallel, and so on.

FIG. 5 depicts an example of a system 500 including a plurality of processor cores of a processing system that is leveraged to perform the object detection techniques described herein. As shown in FIGS. 2-4 and subsequent discussion of FIG. 6, a variety of different operations may be performed to improve performance and reduce consumption of computational resources of a computing device 102 to perform object detection. Another example of such an improvement may involve leveraging of a multi-core processor.

As depicted in the system 500 of FIG. 5, for instance, a quad-core processing system 106 is shown that includes processor cores 502, 504, 506, 508. Each of the processor cores 502-508 may be configured to execute a respective thread and as such execution of the threads by the processor cores 502-508 may be performed in parallel. For example, processor core 502 may be utilized to execute the operating system 112. The other processor cores 504-508 may be utilized to perform object detection 510, 512, 514 operations.

A variety of different combinations of object detection 510-514 operations may be performed by the processor cores 504-508. For example, different scales of portions in which the object detection module 118 is to perform object detection as described in relation to FIG. 2 may be performed in parallel. Likewise, different regions of the same or different images may be processed as described in relation to FIG. 3, different angles of orientation of an object may be analyzed as described in relation to FIG. 4, and so on. In another example, different types of operations involved in object detection may be performed by different ones of the plurality of processor cores 504-508, such as different scales, regions, and/or orientations may be analyzed by the respective cores.

Additionally, operations may be managed to support desired functionality. In the example described in relation to FIG. 2, for instance, successively smaller search areas were utilized in one implementation such that a largest face in an image 120 was detected. To support similar functionality in a multi-core system, the threads may be managed such that if a face is detected by a thread, other threads processing smaller areas may be caused to stop processing, while larger areas (if any) may continue to be processed. Other examples are also contemplated, such as to promote location of a user facing a computing device 102 as described in relation to FIG. 4.

Figure 6:
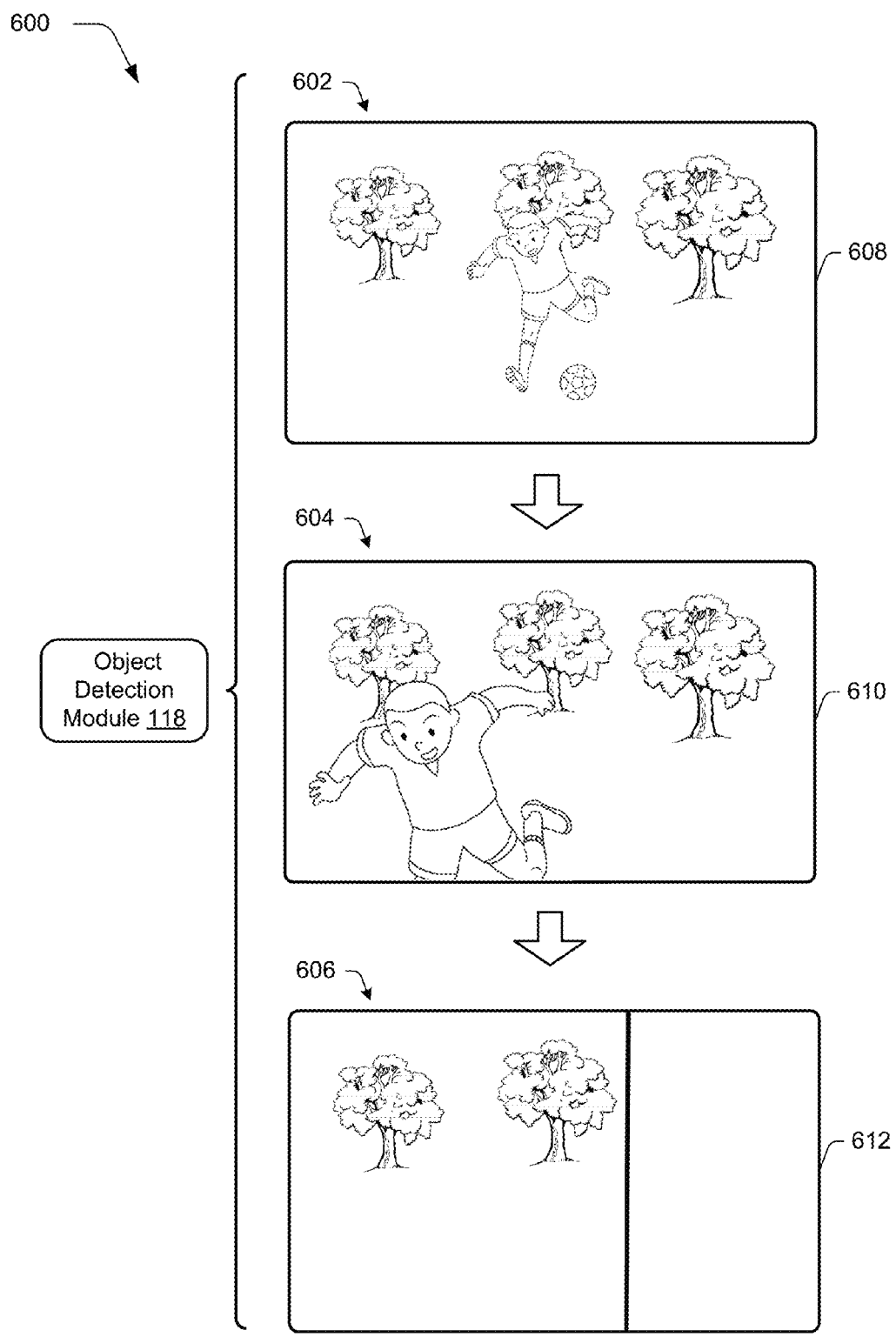
FIG. 6 depicts a system in an example implementation in which historical data is leveraged to perform object detection.

FIG. 6 depicts a system 600 in an example implementation in which historical data is leveraged to perform object detection. As previously described, the image 120 may be part of an image stream captured by a camera 122 of the computing device 102 or other device. As such, a plurality of images 120 may be processed by the object detection module 118 to detect objects and therefore this past processing may be leveraged to aid subsequent processing performed by the object detection module 118.

For example, a plurality of operations performable by an object detection module 118 are illustrated as first, second, and third operations 602, 604, 606 for respective first, second, and third images 608, 610, 612. In the first operation 602, the object detection module 118 may detect a face of a soccer player in image 608. In the second operation 604, the object detection module 118 may again detect the face of the soccer player in the image 610, but this time the face is both larger and at a different location than in image 608.

At the third operation 606, the face of the soccer player is no longer included in the image 612 and consequently the object detection module 118 has "lost" the object. Accordingly, the object detection module 118 may leverage heuristics generated from previous detections to optimize subsequent operations utilized to detect the object. For example, a location at which the object was last detected may serve to define a region that is to be searched as shown in the third operation 606. Thus, detected movement of the object may be utilized as a basis to predict a likely location of where the object may be detected in a subsequent image.

A scale of the object may also be leveraged, such as to begin a search in subsequent images based on a most recent scale of the object when last detected, used to predict the range of likely scale of the object in a second frame, and so on. Other examples are also contemplated, such as to begin an analysis for a likely angle (e.g., orientation) of the object based on past orientations, and so on.

Additionally, operations may incorporate a plurality of the different techniques described above. In the implementation example below, for instance, the object detection module 118 executes instructions to search (left, small), (left, large), (right, small), (right, large), then starts over again on successive frames, in order to spend fewer cycles on the face detection of one frame but increase the latency of successful detection a little bit, i.e. within 4 frames, instead of just one frame. When a face is found, the module searches 40% of the face scale to the left and right, horizontally, and 20% above and below, vertically, and restricts the scale to two scales smaller and larger, in size. These values may vary based on a frame rate and how far the face is expected to move between frames, and the target frame resolution. For example, at higher frame rates the region and scale area may be reduced further.

```
LONG currentSearchPiece = 0
  RECT rearchAreaPiece[ ] = {
    {0, 0, videoMediaType.width * 75%, videoMediaType.height * 75%},
    {videoMediaType.width * 25%, videoMediaType.height * 25%,
  videoMediaType.width, videoMediaType.height},
  }
  LONG faceMinPiece[ ] = {
    MIN_FACE_SIZE,
    MIN_FACE_SIZE + ((MAX_FACE_SIZE - MIN_FACE_SIZE) / 2),
  }
  LONG faceMaxPiece[ ] = {
    faceMinPiece[1] + 1,
    MAX_FACE_SIZE,
  }
  FACE Detect(lastFace, videoFrame)
  {
    FACE returnFace;
    If (face is found)
    {
      LONG faceWidth = (lastFace.right - lastFace.left)
      LONG faceHeight = (lastFace.bottom - lastFace.top)
      LONG additional Width = (faceWidth) * 40%
      LONG additionalHeight = (faceHeight) * 20%
      RECT searchArea = {
        MAX(lastFace.left - addtionalWidth, 0),
        MAX(lastFace.top - additionalHeight, 0),
        MIN(lastFace.right + addtionalWidth, videoMediaType.width),
        MAX(lastFace.top + additionalHeight, videoMediaType.height)}
      LONG faceMin = MAX(lastFace.size-2, MIN_FACE_SIZE)
      LONG faceMax = MIN(lastFace.size+2, MAX_FACE_SIZE)
      returnFace = FaceDetect(videoFrame, searchArea, faceMin,
  faceMax)
    }
    Else
    {
      currentSearchPiece = (currentSearchPiece+1) % 4;
      RECT searchArea = rearchAreaPiece[currentSearchPiece % 2]
      LONG faceMin = faceMinPiece[currentSearchPiece / 2]
      LONG faceMax = faceMaxPiece[currentSearchPiece / 2]
      returnFace = FaceDetect(videoFrame, searchArea, faceMin,
  faceMax)
    }
    return returnFace
  }
```

Example Procedures

The following discussion describes object detection techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
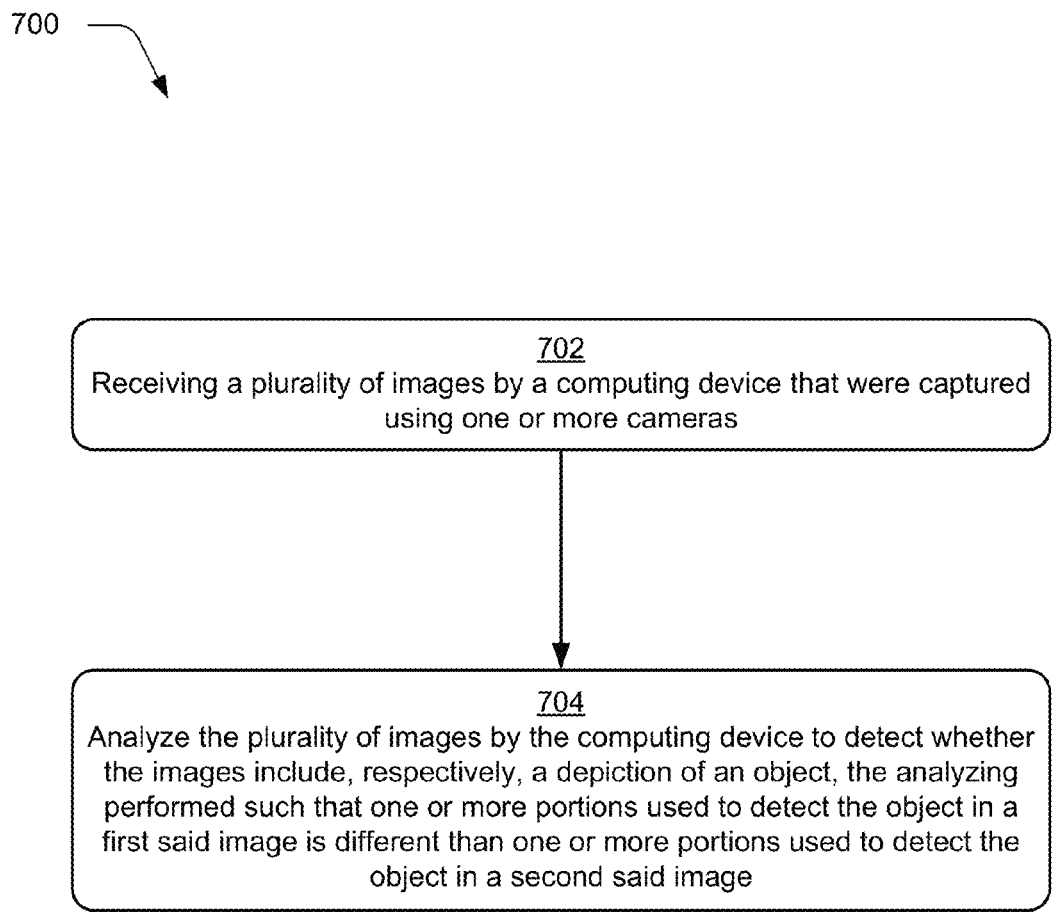
FIG. 7 is a flow diagram depicting a procedure in an example implementation in which object detection is performed such that images are processed differently to perform the detection

FIG. 7 depicts a procedure 700 in an example implementation in which object detection is performed such that images are processed differently to perform the detection. A computing device receives a plurality of images that were captured using one or more cameras (block 702). This may include images 120 captured by a camera 122 of the computing device 102 or other computing device, through implementation as a web service, and so on.

The plurality of images are analyzed by the computing device to detect whether the images include, respectively, a depiction of an object. The analyzing is performed such that one or more portions used to detect the object in a first one of the images is different than one or more portions used to detect the object in a second one of the images (block 704). The differences may be defined in a variety of ways, such as to analyze different portions of the image, likely scales or angles (e.g., orientations) of the object, and so on. Further, these difference may be combinable into a process, an example of which is shown in the implementation example above.

Figure 8:
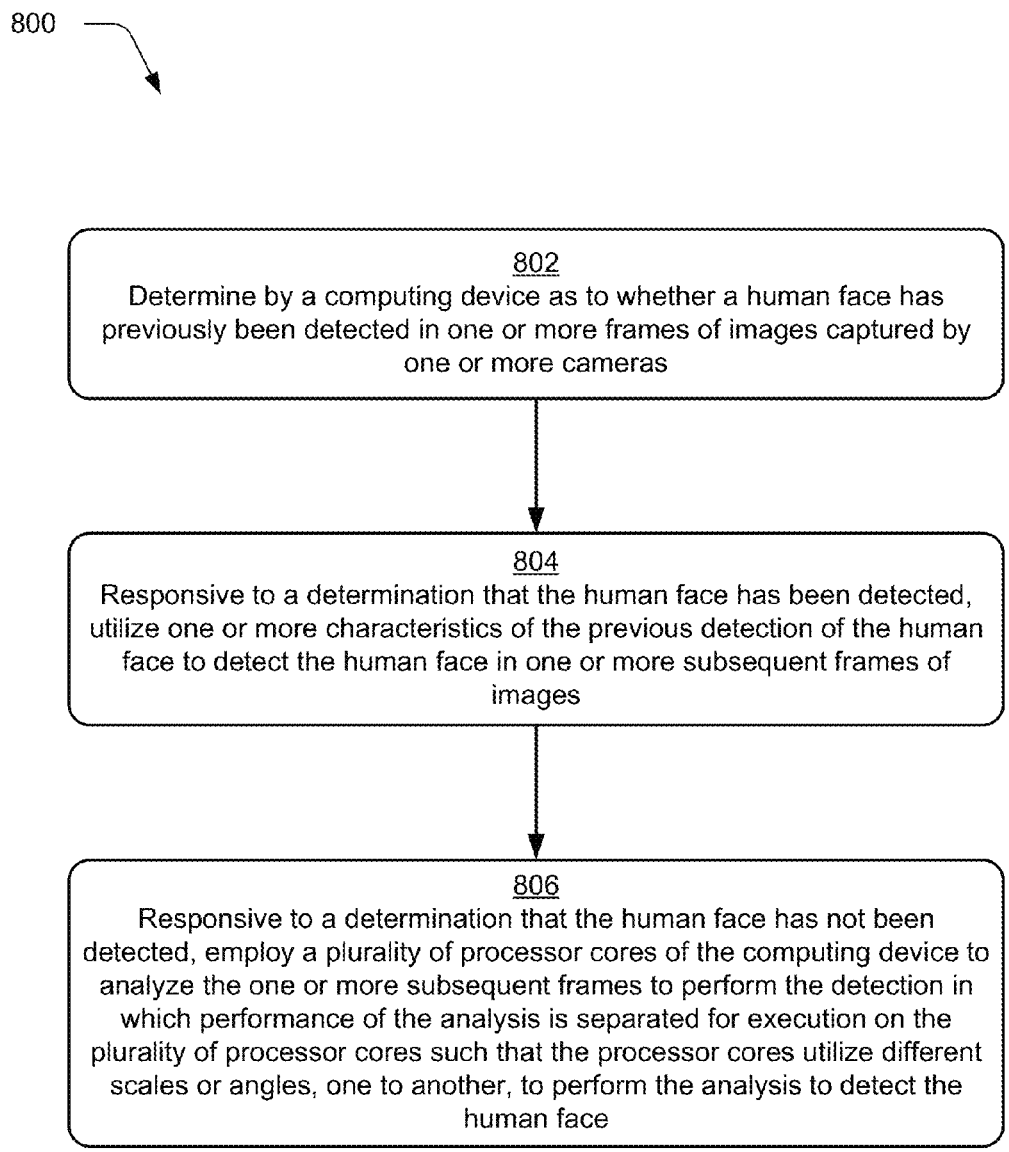
FIG. 8 is a flow diagram depicting a procedure in an example implementation in which previous detection of an object such as a human face is leveraged to perform object detection.

FIG. 8 depicts a procedure 800 in an example implementation in which previous detection of an object such as a human face is leveraged to perform object detection. A determination is made by a computing device as to whether a human face has previously been detected in one or more frames of images captured by one or more cameras (block 802). For example, the image detection module 118 may have processed a plurality of images 120 in a video stream to locate an object. Therefore, this determination may be based on whether that object was detected in the images 120.

Responsive to a determination that the human face has been detected, one or more characteristics of the previous detection of the human face are utilized to detect the human face in one or more subsequent frames of images (block 804). For example, the characteristics may describe a location, scale, angle, and so on of the object (e.g., face) detected. These characteristics may then serve as a basis to form a prediction as to where/how the object is to be detected in subsequent images in the video stream.

Responsive to a determination that the human face has not been detected, a plurality of processor cores of the computing device are employed to analyze the one or more subsequent frames to perform the detection in which performance of the analysis is separated for execution on the plurality of processor cores such that the processor cores utilize different scales or angles, one to another, to perform the analysis to detect the human face (block 806). As described in relation to FIG. 6, for instance, different operations may be performed by different processor cores of a processing system 106 to locate the image. In one or more implementations, the plurality of processor cores may also be employed in the even an image has been detect in previous images, e.g., such to target different characteristics using different cores. A variety of other examples are also contemplated as previously described.

Example System and Device

Figure 9:
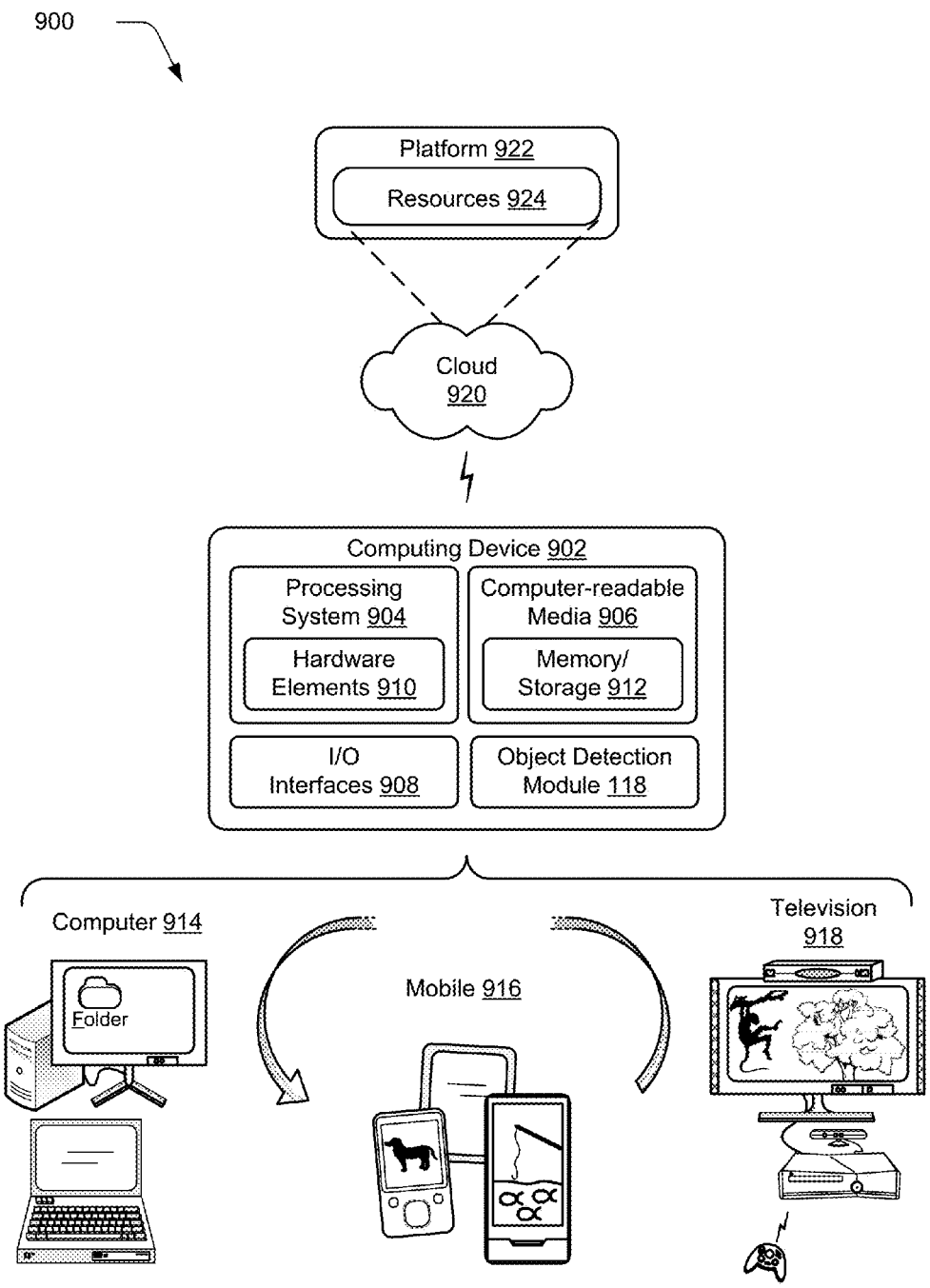
FIG. 9 illustrates an example system including various components of an example device that can be implemented as any type of computing device as described with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein as illustrated through inclusion of the object detection module 118. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method comprising:
receiving a plurality of images by a computing device, the computing device having a processor including a first processor core and a second processor core;
determining, by the computing device, whether an object has been previously detected in one or more frames of the plurality of images;
responsive to a determination that the object has not been detected, employing the first processor core and the second processor core of the computing device for analyzing one or more subsequent frames of the plurality of images by the computing device to detect whether the images include, respectively, a depiction of the object, the analyzing performed such that one or more portions of the plurality of images used to detect the object by the first processor core is different than one or more portions of the plurality of images used to detect the object by the second processor core; and
presenting object detection information for the object to a user via an output device.

2. A method as described in claim 1, wherein the difference in the one or more portions for the respective first and second said images involves a scale assigned for the object to perform the analyzing.

3. A method as described in claim 1, wherein the difference in the one or more portions for the respective first and second said images involves a region of the respective first and second said images that is utilized to perform the analyzing.

4. A method as described in claim 1, wherein the difference in the one or more portions for the respective first and second said images involves an angle at which the object is to be detected in the respective first and second said images.

5. A method as described in claim 1, wherein the difference in the one or more portions for at least one of the respective first and second said images is based on a previous detection of the object in one or more of the plurality of frames.

6. A method as described in claim 5, wherein the previous detection in indicates a scale of the object that is to be used as a basis to perform the analysis.

7. A method as described in claim 5, wherein the previous detection in indicates a location of the object in the one or more of the plurality of images that is to be used as a basis to perform the analysis.

8. A method as described in claim 5, wherein the previous detection in indicates motion of the object in the one or more of the plurality of images that is to be used as a basis to perform the analysis.

9. A method as described in claim 8, wherein the motion indicates a direction of movement of the object in the one or more of the plurality of images.

10. A method as described in claim 5, wherein the previous detection in indicates an angle of the object in the one or more of the plurality of images that is to be used as a basis to perform the analysis.

11. A method as described in claim 1, wherein the object is a human face.

12. A method as described in claim 1, wherein the analyzing is configured to be performed such that detection of the object by one of the processor cores causes operations performed by the other processor core to perform the analyzing to cease.

13. A method as described in claim 1, wherein the analyzing is performed by the first processor core and the second processor core in parallel.

14. A system comprising:
one or more processors; and
one or more computer-readable storage media storing instructions that are executable by the one or more processors to perform operations including:
receiving a plurality of images by a computing device, the computing device having a processor including a first processor core and a second processor core;
determining, by the computing device, whether an object has been previously detected in one or more frames of the plurality of images;
responsive to a determination that the object has not been detected, employing the first processor core and the second processor core of the computing device for analyzing one or more subsequent frames of the plurality of images by the computing device to detect whether the images include, respectively, a depiction of the object, the analyzing performed such that one or more portions of the plurality of images used to detect the object by the first processor core is different than one or more portions of the plurality of images used to detect the object by the second processor core; and
presenting object detection information for the object to a user via an output device.

15. A system as described in claim 14, wherein the difference in the one or more portions for the respective first and second said images involves a scale assigned for the object to perform the analyzing.

16. A system as described in claim 14, wherein the difference in the one or more portions for the respective first and second said images involves a region of the respective first and second said images that is utilized to perform the analyzing.

17. A system as described in claim 14, wherein the difference in the one or more portions for the respective first and second said images involves an angle at which the object is detected.

18. A system as described in claim 14, wherein the analyzing is performed by the first processor core and the second processor core in parallel.

19. A system as described in claim 14, wherein the analyzing is configured to be performed such that detection of the object by one of the processor cores causes operations performed by the other processor core to perform the analyzing to cease.

20. A system as described in claim 14, wherein the object is a human face.

21. A method comprising:
determining whether an object has been previously detected in one or more images;
responsive to a determination that the object has not been detected, employing a processor with a first processor core and a second processor core for analyzing the one or more images to detect a depiction of the object;
separating execution of the analyzing on the first processor core and the second processor core such that the first processor core and the second processor core utilize different respective portions of the one or more images to perform the analyzing to detect the object; and
presenting the object detection information for the object to a user via an output device.

22. A method as described in claim 21, wherein the difference in the different portions involves a scale assigned for the object to perform the analyzing.

23. A method as described in claim 21, wherein the difference in the different portions for the respective images involves a region of the respective images that is utilized to perform the analyzing.

24. A method as described in claim 21, wherein the difference in the different portions for the respective images involves an angle at which the object is detected.

25. A method as described in claim 21, wherein the object is a human face.

26. A method as described in claim 21, wherein the analyzing is performed by the first processor core and the second processor core in parallel.

27. A method as described in claim 21, wherein the analyzing is configured to be performed such that detection of the object by one of the processor cores causes operations performed by the other processor core to perform the analyzing to cease.

* * * * *